Dec. 16, 1941.   L. M. FRANCIS   2,266,543
SKID STRUCTURE
Filed Feb. 17, 1941

INVENTOR.
LYNN M. FRANCIS
BY
ATTORNEYS

Patented Dec. 16, 1941

2,266,543

UNITED STATES PATENT OFFICE 2,266,543

SKID STRUCTURE

Lynn M. Francis, Birmingham, Mich., assignor to Whitehead & Kales Company, River Rouge, Mich., a corporation of Michigan Application February 17, 1941, Serial No. 379,319

3 Claims. (Cl. 193—41)

This invention relates generally to skid structures and refers more particularly to those designed for use in loading motor vehicles upon and unloading them from the upper and lower decks respectively of carry-car trucks and/or trailers.

Heretofore skids of various design have been provided for this purpose but in most instances, in so far as I am aware, the floor or tread surface of the skids have been solid and imperforate and usually have been provided with upstanding projections or roughened surfaces to afford traction for the wheels of the vehicle being loaded or unloaded. However, during the winter when snow or ice accumulated on such skids it would pack between the projections or roughened surface and thus would render inefficient the traction means mentioned. At other times of the year dirt, sand, mud, etc., would accumulate on the skid and would likewise interfere with the proper traction. Moreover, such solid skids were relatively heavy and hard to handle. In addition, the cost of manufacturing such skids was quite an item, consequently skids of that type were objectionable.

In the present instance I have provided a skid structure that overcomes the difficulties referred to; that is provided with an open or apertured tread surface to let snow, ice, mud, etc., fall through so that the traction will be unhampered; that has an improved tread surface for better traction; that is economical to manufacture; and that is lighter in weight and easier to handle.

Figure 1:
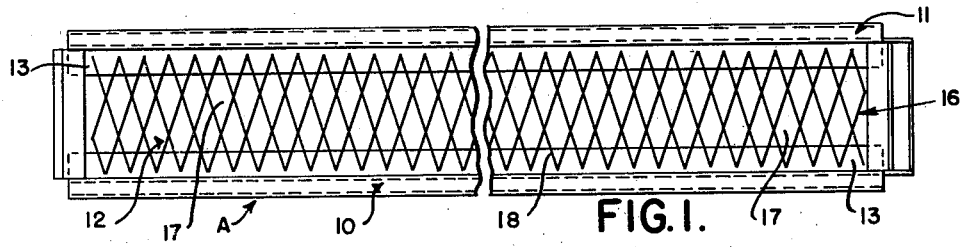
Figure 1 is a top plan view of a skid structure embodying my invention.
Figure 2:
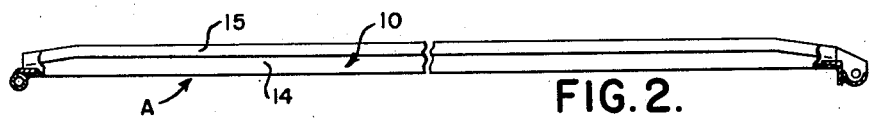
Figure 2 is a side elevation thereof.
Figure 3:
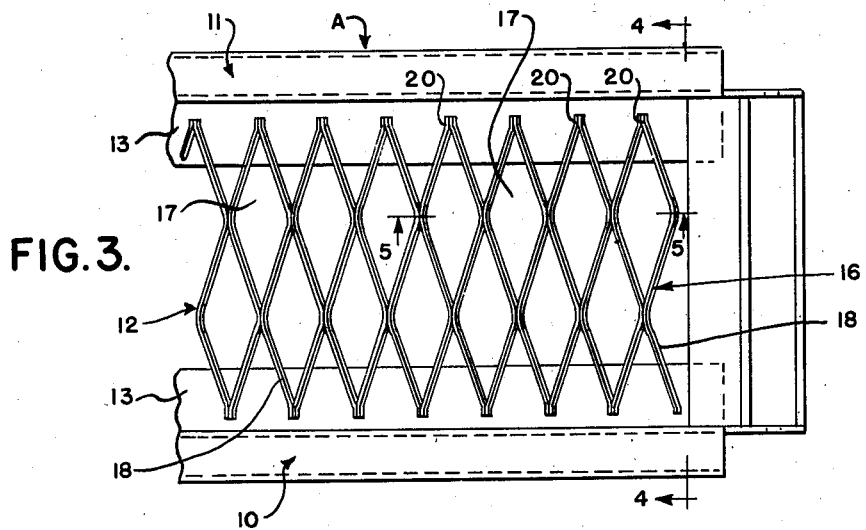
Figure 3 is an enlarged plan view of a portion of Figure 1.
Figure 4:
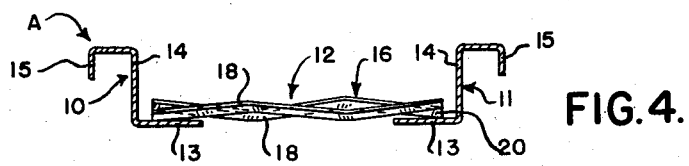
Figure 4 is a cross sectional view taken substantially on the line 4—4 of Figure 3.
Figure 5:
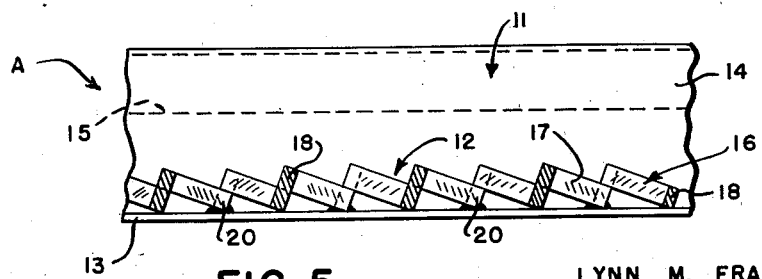
Figure 5 is an enlarged sectional view taken substantially on the line 5—5 of Figure 3.

Referring now to the drawing, A is a skid embodying my invention having side rails 10 and 11, and a tread member 12.

As shown, the side rails 10 and 11 are similar in configuration and each comprises an inverted channel-shape member having an inturned lateral flange 13. Such channel member is preferably formed of relatively heavy gauge sheet metal and may be rolled or pressed into the configuration desired. Preferably the inner walls 14 of the channel members are deeper than the outer walls 15 thereof and are provided at their lower edges with the lateral flanges 13.

The tread member 12 extends lengthwise of and spans or bridges the space between the inturned lateral flanges 13 of the side rails 10 and 11, and preferably comprises one or more expanded metal strips 16. As shown, each strip 16 rests upon and is rigidly secured to the upper surfaces of the inturned flanges 13 of the side rails, preferably in spaced relation to the upright inner walls 14 thereof. Such expanded metal provides an open mesh that not only permits snow, sleet, mud, and other foreign matter to fall through without interfering with the tread surface, but provides better traction for the wheels of the vehicles being loaded and unloaded. For example, the substantially diamond-shaped apertures 17 of the mesh extend transversely or crosswise of the skid, while the metal ribbons 18 of the mesh bordering such apertures are arranged in overlapping relation and incline slightly relative to the flat upper surfaces of the side rail flanges 13. Thus, a progressive series of inclined steps are provided for non-slippage traction engagement with the wheels of the vehicles being loaded or unloaded. In the present instance the thickness or depth of each ribbon 18 is approximately one-quarter of an inch, while the width thereof is approximately three-eighths of an inch. This, of course, may be varied as occasion requires.

Any suitable means such as welding or brazing operations may be employed to secure the tread member 12 rigidly to the inturned flanges 13 of the side rails. In this connection it will be noted that, with the exception of the ribbon at one end of the skid which has opposite ends thereof welded or brazed to the inturned flanges 13 of the side rails, the right-hand end portions 20 of alternate ribbons 18 forming the steps are welded or brazed to the inturned flange 13 of the side rail 11, while the left-hand end portions of alternate ribbons 18 are welded or brazed to the inturned flange 13 of the side rail 10. Thus, the mesh formed by the expanded metal is securely anchored at a series of points to the rails at each side of the skid.

In the process of construction, the side rails 10 and 11 may be formed separately to the desired configuration and spaced apart the desired distance in the manner shown. Strips of sheet metal of the desired width may then be slit along staggered straight lines and then stretched to provide the apertures 17 and bordering ribbons 18. Alternate ends of the ribbons, as aforesaid, may then be welded or brazed to the inturned flanges 13 of the side rails 10 and 11 to provide the skid structure.

Such skid structure may be provided at opposite ends thereof with any suitable means for attachment to either the upper or lower deck of a carry-car truck or trailer.

As shown, the inner and outer walls 14 and 15, respectively, of the channel-shaped side rails extend upwardly relative to the inturned lateral flanges 13 so as to serve as side guards or guides for the wheels of automobiles being loaded or unloaded. However, if desired, such channel portions may extend downwardly below the inturned lateral flanges 13, for example, when the skids are used for loading and unloading heavier vehicles such as trucks having dual wheels.

Thus, from the foregoing, it will be apparent that the skid structure described will insure proper traction in all weather conditions for the wheels of the vehicles being loaded and unloaded. It is relatively light and easy to handle and is especially strong and durable in construction, hence a very efficient skid structure is provided.

What I claim as my invention is:

1. A portable elongated skid member of the class described having two laterally spaced elongated side rails, and an intermediate tread member, said side rails being inverted channel-shaped members, the inner upright walls of the channels having inturned substantially flat lateral flanges at their lower longitudinal edges, the tread member being a strip of expanded metal extending longitudinally of the side rails between the upright inner walls thereof and overlapping the inturned lateral flanges, said expanded metal strip providing an open mesh having transversely extending substantially diamond-shaped openings through which snow, dirt, sleet and the like may fall and transversely extending bordering metal ribbons of substantially rectangular cross section, said ribbons overlapping and inclining slightly relative to the flat lateral flanges so as to provide a progressive series of inclined steps for non-slippage traction engagement with the wheels of a vehicle, alternate end portions of successive transversely extending ribbons being in contact with and welded to the lateral flanges of said rails.

2. A portable elongated skid member of the class described having two substantially parallel elongated side rails, and an intermediate tread member, said side rails being inverted channel-shaped members of relatively heavy gauge metal, the inner upright walls of the channels being deeper than the outer upright walls thereof and provided along their lower longitudinal edges with substantially flat inturned lateral flanges, the tread member being a strip of expanded metal extending longitudinally of the side rails between the upright inner walls thereof and overlapping the inturned lateral flanges, said expanded metal strip providing an open mesh having transversely extending elongated openings through which snow, dirt, sleet and the like may fall and transversely extending bordering metal ribbons of substantially rectangular cross section, said ribbons overlapping and inclining slightly relative to the flat lateral flanges so as to provide a progressive series of inclined steps for non-slippage traction engagement with the wheels of a vehicle, alternate end portions of successive transversely extending ribbons being in contact with and welded to the lateral flanges of said rails.

3. A portable elongated skid member of the class described having two substantially parallel elongated side rails, and an intermediate tread member, said side rails being inverted channel-shaped members of relatively heavy gauge metal, the inner upright walls of the channels having inturned substantially flat lateral flanges, the tread member being a strip of expanded metal extending longitudinally of the side rails between the upright inner walls thereof and overlapping the inturned lateral flanges, said expanded metal strip providing an open mesh having transversely extending substantially diamond-shaped openings through which snow, dirt, sleet and the like may fall and transversely extending bordering metal ribbons of substantially rectangular cross section, the end portions of successive transversely extending ribbons being alternately in contact with and spaced above the lateral flanges of the side rails, said contacting end portions being welded to the lateral flanges of said rails, the tread member terminating short of opposite ends of the side rails, and crossbars extending between and secured to said side rails beyond opposite ends of said tread member.

LYNN M. FRANCIS.